(No Model.) 2 Sheets—Sheet 1.
C. J. MULFORD.
CHOCOLATE POT.
No. 411,870. Patented Oct. 1, 1889.
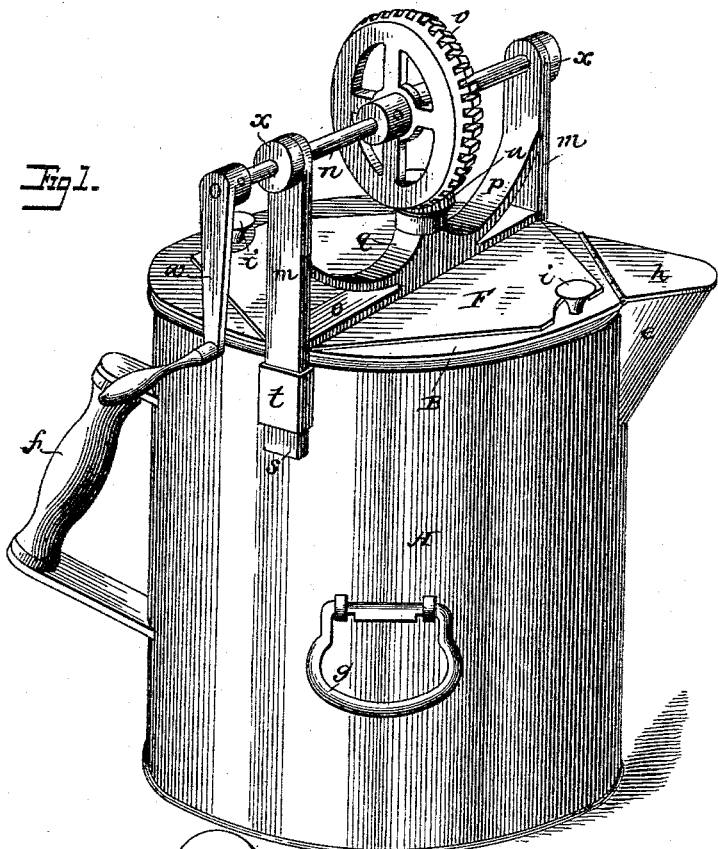
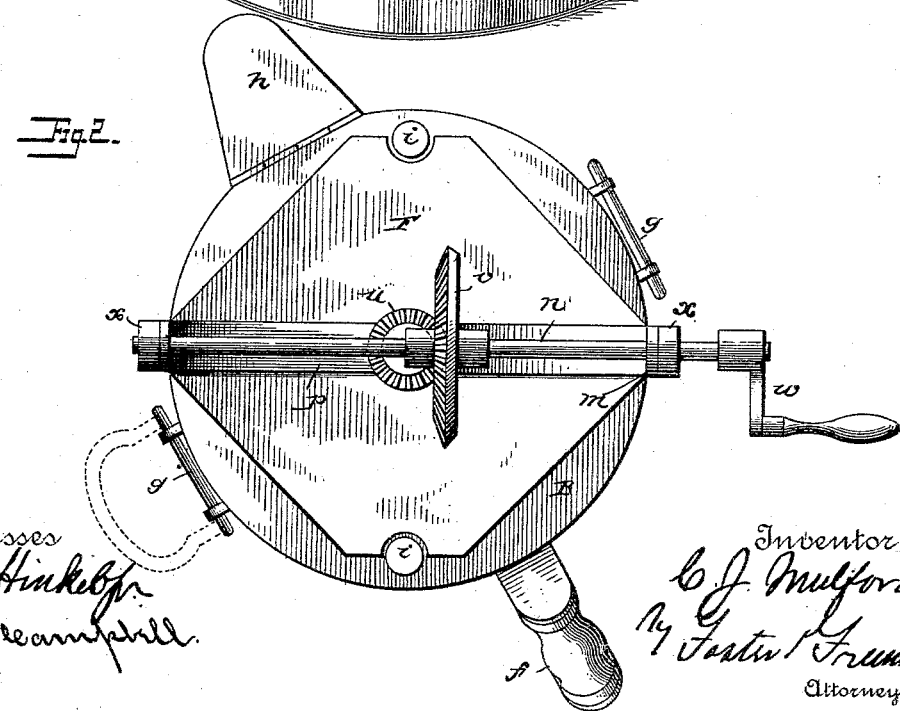
Witnesses  
Jno. F. Hinkel Jr.  
N. G. Campbell
Inventor  
C. J. Mulford  
By Foster & Freeman  
Attorneys (No Model.) 2 Sheets—Sheet 2.
C. J. MULFORD.
CHOCOLATE POT.
No. 411,870. Patented Oct. 1, 1889.
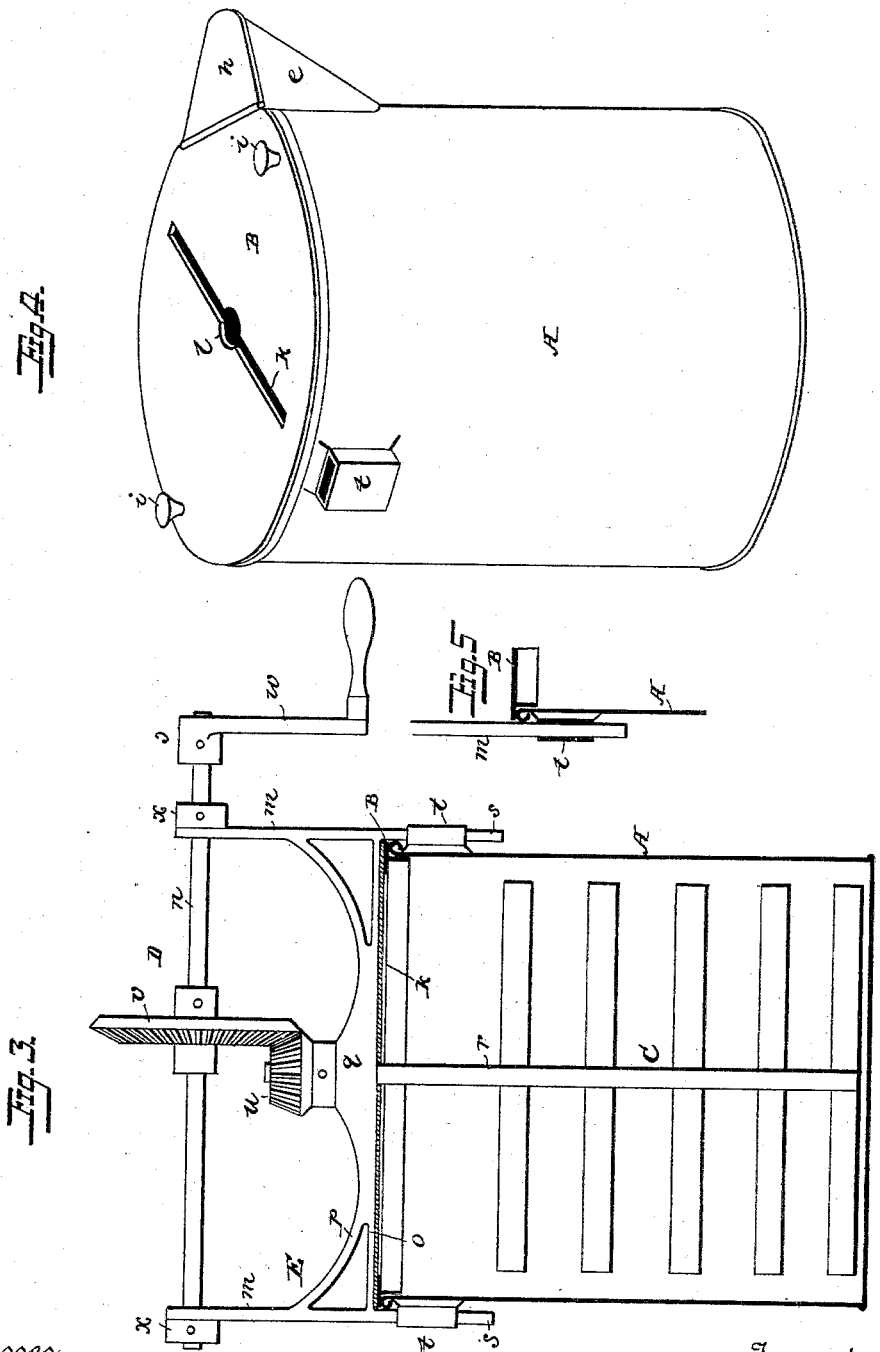
Witnesses
Inventor
C. J. Mulford
Attorneys

UNITED STATES PATENT OFFICE.

CHARLES J. MULFORD, OF NEW YORK, N. Y.

CHOCOLATE-POT.

SPECIFICATION forming part of Letters Patent No. 411,870, dated October 1, 1889.

Application filed May 25, 1888. Serial No. 275,062. (No model.)

*To all whom it may concern:*

Be it known that I, CHARLES J. MULFORD, a citizen of the United States, and a resident of the city, county, and State of New York, have invented certain new and useful Improvements in Chocolate-Pots, of which the following is a specification.

This invention relates to a vessel adapted to the preparation of chocolate and analogous material for drinking purposes; and it consists in the novel structure hereinafter fully set forth.

The accompanying drawings illustrate the practical embodiment of the invention, in which—

Figure 1 represents a perspective view of a vessel or chocolate-pot; Fig. 2, a plan view thereof; Fig. 3, a vertical central sectional elevation; Fig. 4, a perspective view of the vessel with the puddler or stirrer and its actuating mechanism removed. Fig. 5 is a sectional detail showing one of the ears for receiving one of the legs of the frame carrying the actuating mechanism.

The improved vessel consists, essentially, of a receptacle A, adapted to hold a quantity of liquid and material with which it is to be mixed, a removable cover B, a puddler C, adapted to the interior of the receptacle, and an actuating mechanism D, for imparting proper motion to said puddler, located over the top of the receptacle and its cover, and so as to be removable therefrom with the puddler without removing the cover.

As shown, the receptacle A consists of a cylindrical vessel having a spout $e$, by which its contents may be poured out, a grasping-handle $f$, and with a pair of pivoted side handles $g$, by which, if the vessel be a large one, it may be carried from place to place. The removable cover B is provided with a hinged portion $h$, adapted to overlie and cover the spout $e$ of the vessel, and with one or more grasping-pieces $i$, by which the cover may be readily removed from the top of the vessel. The cover is also provided centrally with a narrow elongated slot $k$, adapted to the passage of the blades of the puddler C therethrough, the said slot having a central enlargement $l$ for the passage of the shaft of said puddler.

The puddler or stirrer C is mounted upon and carried by the frame E, supporting the actuating mechanism. This frame consists of a pair of vertical uprights $m$, having at their upper ends bearings for a horizontal shaft $n$, and near their lower ends the uprights are connected by a horizontal bar $o$ and by a second curved bar $p$, having a central enlargement to provide a bearing $q$ for the support of the vertical shaft $r$ of the puddler. Each of the vertical uprights $m$ extend below the horizontal cross-bar $o$, forming legs $s$, which enter sockets provided in ears $t$, projecting from and secured to the side of the vessel. The upper end of the vertical rod $r$ of the puddler is provided with a small pinion $u$, secured thereto, and in practice rests upon the top of the bearing $q$ and supports the rod $r$ in such manner that the said rod may be rotated without being otherwise supported. Motion is imparted to the pinion $u$ by a beveled wheel $v$, secured upon the horizontal shaft $n$, said shaft being provided with a handle $w$, by which it may be conveniently rotated. It may be stated that the shaft $n$ is a plain shaft kept in proper position in the bearings in the upper ends of the uprights $m$ by means of collars $x$, which obviously prevent it from moving laterally, and also embrace the uprights and prevent them from spreading.

In the smallest sizes of this class of vessel the cross-bar $o$ will immediately rest upon the cover B and close the elongated slot and opening therein, and thereby prevent the escape of the aroma of the mixture being prepared; but in larger-sized vessels it will be found more practical and give material strength and steadiness to the actuating mechanism to provide its frame with a plate F, secured in any manner to said frame or to the under side of the cross-bar $o$, so as to present an extended bearing-surface overlying the cover, which will brace the frame and prevent any undue motion between it and the vessel. This plate F may obviously take any shape that the fancy of the maker of the vessel may dictate, and may consist of a plate overlying the entire cover or only so much thereof as may be necessary to impart stiffness to the actuating frame and take off unnecessary strain from the ears $t$.

The frame E, composed of the uprights $m$ and cross-bars $o$ and $p$, are in practice designed to be cast in a single piece; but obviously the curved cross-bar $p$ may be cast integral with the cross-bar $o$ or separately therefrom, and suitably riveted to both said cross-bar and to the uprights $m$; or it may consist of a properly-curved plate having a central enlargement adapted to form the bearing $q$, to provide a proper support for the shaft of the puddler. This form of bar $p$ provides a suitable brace for the uprights $m$, and being also connected to the cross-bar $o$ presents a rigid structure capable of holding the shaft $r$ in a perpendicular position and prevent it from having any undue wabbling motion.

With this understanding of the construction of the vessel it will be understood that after the preparation of the mixture has been completed, which during this preparation has been constantly stirred by the puddler through the means of its actuating mechanism, said puddler and the frame may be readily removed from the vessel without removing its cover B by simply lifting the uprights out of the sockets in the ears $t$ and withdrawing the shaft $r$ and its blades through the slot and hole in the cover. The construction also enables the puddler and its frame to be readily replaced in and onto the vessel without the removal of its cover B, and thus preventing the escape of any material part of the aroma contained in the vessel. Of course the slot $k$ and the opening $l$ may be provided with a covering-piece to take the place of the frame E when it is removed, if it should be found desirable.

What I claim is—

1. The herein-described vessel, provided with a cover having an elongated slot therein and a detachable puddler or stirrer adapted to be supported upon said vessel over the cover and extending into the vessel and removable therefrom through the slot in its cover.

2. The combination, with a vessel and its cover B, having a central elongated slot therein, of a detachable frame supporting a vertical shaft having blades and an extended plate F, secured to said frame and bearing upon the cover, substantially as described.

3. The combination, with a vessel and its cover B, having a central elongated slot therein, of a frame removably supported over the cover, provided with a cross-piece $o$, and a curved bar $p$, providing a bearing $q$, a vertical shaft $r$, having a beveled pinion at its end supporting the same in said bearing, so that it may depend therefrom into the vessel through the slot in its cover, a horizontal shaft $n$, and a driving-wheel $v$, meshing with said pinion for rotating the shaft, substantially as described.

In testimony whereof I have signed my name to this specification in the presence of two subscribing witnesses.

CHARLES J. MULFORD.

Witnesses:
 MARSHALL P. STAFFORD,
 JAMES W. ROSS.